(12) United States Patent
Zhou et al.

(10) Patent No.: US 10,838,838 B2
(45) Date of Patent: Nov. 17, 2020

(54) METHOD AND APPARATUS FOR DEALING WITH ABNORMALITY OF APPLICATION PROGRAM AND STORAGE MEDIUM

(71) Applicant: Tencent Technology (Shenzhen) Company Limited, Shenzhen (CN)

(72) Inventors: Liujing Zhou, Shenzhen (CN); Zhaowu Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/504,810

(22) Filed: Jul. 8, 2019

(65) Prior Publication Data

US 2019/0332513 A1    Oct. 31, 2019

Related U.S. Application Data

(63) Continuation of application No. PCT/CN2018/081525, filed on Apr. 2, 2018.

(30) Foreign Application Priority Data

Apr. 26, 2017    (CN) .......................... 2017 1 0282449

(51) Int. Cl.
*G06F 11/30*    (2006.01)
*G06F 11/07*    (2006.01)
(Continued)

(52) U.S. Cl.
CPC ........ *G06F 11/3051* (2013.01); *G06F 11/079* (2013.01); *G06F 11/302* (2013.01);
(Continued)

(58) Field of Classification Search
None
See application file for complete search history.

(56) References Cited

U.S. PATENT DOCUMENTS

| 8,516,295 B2 | 8/2013 | Malisetti et al. |
| 9,274,894 B1 * | 3/2016 | Perry ................. G06F 11/0715 |

(Continued)

FOREIGN PATENT DOCUMENTS

| CN | 104992117 A | 10/2015 |
| CN | 105279433 A | 1/2016 |

(Continued)

OTHER PUBLICATIONS

Tencent Technology, ISR, PCT/CN2018/081525, Jun. 15, 2018, 2 pgs.

(Continued)

*Primary Examiner* — Thomas J Dailey
(74) *Attorney, Agent, or Firm* — Morgan, Lewis & Bockius LLP

(57) ABSTRACT

Embodiments of this application provide a method performed at a computing device for dealing with an abnormality of an application program. The method includes: recording scene information obtained during operation of an application program; receiving abnormality indication information indicating that an abnormality occurs to the application program; in response, extracting, from the recorded scene information, corresponding scene information, where the application program is divided into a plurality of functional modules, each of the functional modules has a plurality of user interfaces (UI), each functional module having a respective unique tag and each US having a respective unique identifier ID, and the recorded scene information including a life cycle node of an operation page that exists during the operation of the application program, and a TAG and an ID corresponding to the operation page; and performing abnormality analysis according to the extracted scene information.

20 Claims, 10 Drawing Sheets

(51) Int. Cl.
*G06F 11/32* (2006.01)
*G06F 11/34* (2006.01)
*G06F 11/36* (2006.01)

(52) U.S. Cl.
CPC ........ *G06F 11/327* (2013.01); *G06F 11/3466* (2013.01); *G06F 11/36* (2013.01); *G06F 11/3636* (2013.01); *G06F 2201/865* (2013.01)

(56) References Cited

U.S. PATENT DOCUMENTS

| | | | |
|---|---|---|---|
| 9,842,017 B1* | 12/2017 | Zhang | G06F 11/3452 |
| 10,013,334 B1* | 7/2018 | Carey | G06F 11/3636 |
| 2016/0077910 A1* | 3/2016 | Dev | G06F 11/34 |
| | | | 714/4.3 |
| 2016/0103752 A1* | 4/2016 | Bates | G06F 11/3632 |
| | | | 717/124 |
| 2016/0371168 A1* | 12/2016 | Chatty | G06F 8/38 |
| 2018/0276102 A1* | 9/2018 | Chandra | G06F 11/3636 |
| 2019/0116178 A1* | 4/2019 | Coffey | H04L 9/3239 |

FOREIGN PATENT DOCUMENTS

| | | |
|---|---|---|
| CN | 105528295 A | 4/2016 |
| CN | 106155741 A | 11/2016 |

OTHER PUBLICATIONS

Tencent Technology, WO, PCT/CN2018/081525, Jun. 15, 2018, 4 pgs.
Tencent Technology, IPRP, PCT/CN2018/081525, Oct. 29, 2019, 5 pgs.

* cited by examiner

METHOD AND APPARATUS FOR DEALING WITH ABNORMALITY OF APPLICATION PROGRAM AND STORAGE MEDIUM

CROSS-REFERENCE TO RELATED APPLICATIONS

This application is a continuation application of PCT/CN2018/081525, entitled "METHOD AND APPARATUS FOR DEALING WITH ABNORMALITY OF APPLICATION PROGRAM AND STORAGE MEDIUM" filed on Apr. 2, 2018, which claims priority to Chinese Patent Application No. 201710282449.5, entitled "METHOD AND APPARATUS FOR DEALING WITH ABNORMALITY OF APPLICATION PROGRAM" filed with the China National Intellectual Property Administration on Apr. 26, 2017, all of which are incorporated by reference in their entirety.

FIELD OF THE TECHNOLOGY

This application relates to the field of computers, and in particular, to a method and an apparatus for dealing with an abnormality of an application program, and a storage medium.

BACKGROUND OF THE DISCLOSURE

With development of electronic technologies and Internet technologies, electronic devices (especially smart mobile devices) have more and more powerful functions. A user can finish various affairs through mobile Internet as long as installing various application programs (APPs) on an electronic device according to demands.

Abnormality may occur during running of an application program, for example, Application Not Responding (ANR) may occur, resulting in influencing user experience and normal usage.

SUMMARY

Embodiments of this application provide a method and an apparatus for dealing with an abnormality of an application program, and a storage medium, to solve the problem that, when an abnormality (such as ANR) occurs in an application program, it is difficult to position a cause and repair the abnormality.

According to a first aspect of this application, an embodiment of this application provides a method for dealing with an abnormality of an application program performed at a computing device having one or more processors and memory storing a plurality of programs to be executed by the one or more processors, the method including:

recording scene information obtained during operation of an application program based on a thread of the application program;

receiving abnormality indication information indicating that an abnormality occurs to the application program;

in response to the abnormality indication information, extracting, from the recorded scene information according to the abnormality indication information, corresponding scene information obtained when the abnormality occurs to the operation of the application program, the application program being divided into a plurality of functional modules, each of the functional modules having a plurality of user interfaces (UI), each of the functional modules having a respective unique tag correspondingly, each of the UIs having a respective unique identifier ID correspondingly, and the recorded scene information including a life cycle node of an operation page that exists during the operation based on the thread of the application program, and a TAG and an ID corresponding to the operation page; and performing abnormality analysis according to the extracted scene information.

According to a second aspect of this application, an embodiment of this application provides a computing device comprising one or more processors, memory coupled to the one or more processors and a plurality of programs stored in the memory that, when executed by the one or more processors, cause the computing device to perform the aforementioned method for dealing with an abnormality of an application program running on the computing device.

According to a third aspect of this application, an embodiment of this application provides a non-transitory computer readable storage medium storing a plurality of machine readable instructions in connection with a computing device having one or more processors. The plurality of machine readable instructions, when executed by the one or more processors, cause the terminal to perform the aforementioned method for dealing with an abnormality of an application program running on the computing device.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Technical solutions in embodiments of this application are described below with reference to the accompanying drawings in the embodiments of this application.

Figure 1:
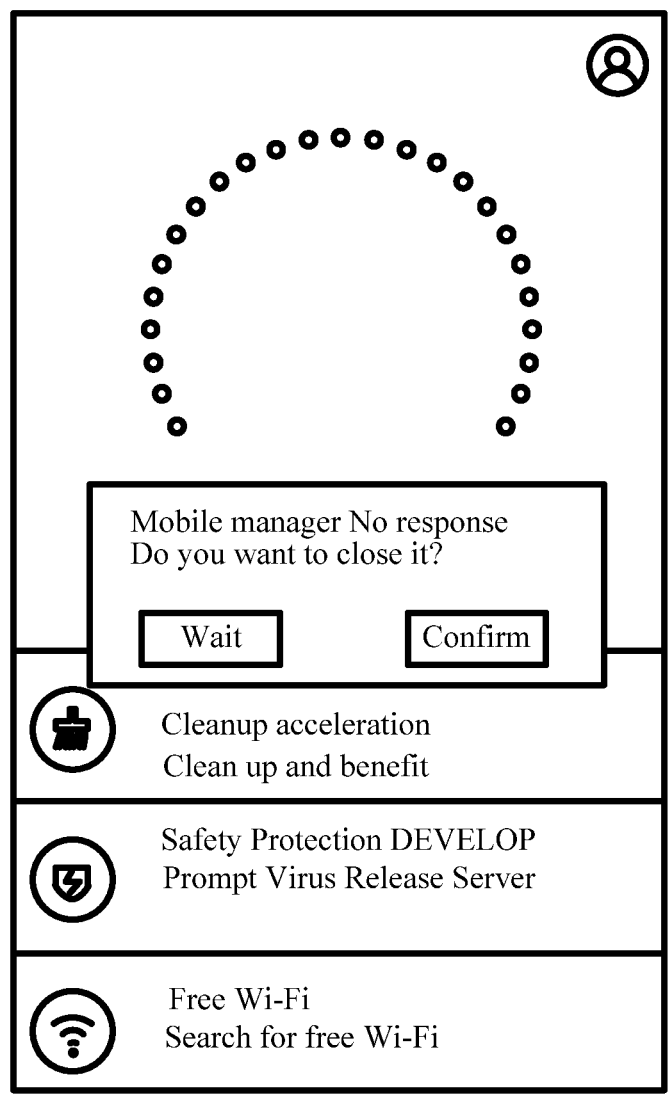
FIG. 1 is a schematic diagram of an interface on which ANR occurs according to an embodiment of this application.

Occurrence of ANR may cause situations that an interface of an APP is clicked without responses, buttons are pressed without responses, sliding is stuck and unsmooth, or the interface is exited automatically. FIG. 1 is a schematic diagram of an interface of an electronic device on which ANR occurs. A box prompting no responses may pop up (as shown in FIG. 1) in some situations, but no prompt box pops up in some situations, that is, an APP suffering invisible ANR will be killed immediately and stop running, seriously influencing user experience and normal usage. When ANR occurs, a system may record a corresponding trace file, for example, an Android system generates a corresponding trace file under a directory /data/anr/ or /data/system/dropbox, and the trace file records, when ANR occurs, situations such as stack and state information of each thread of an APP and system basic modules and whether a deadlock occurs.

In an actual application, a cause of ANR attempts to be positioned through analyzing a trace file. However, more than 80% of stack information in the trace file is trace information about inside of a system, and specific services in an APP or operations of a user that cause ANR cannot be specifically positioned. Therefore, for most of ANR problems, it is difficult to position a cause and perform a repair.

Figure 2:
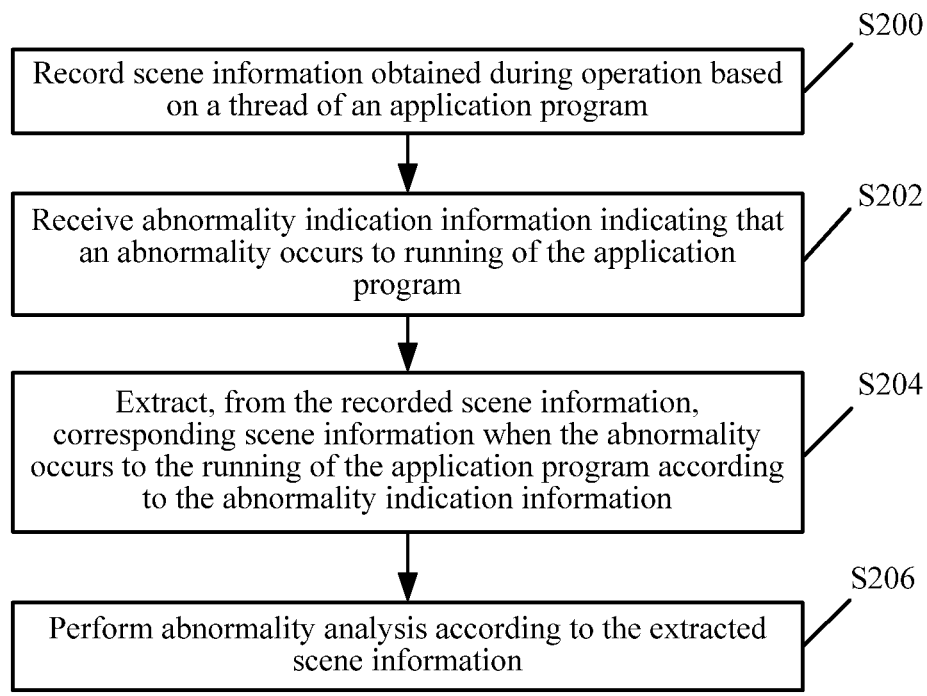
FIG. 2 is a schematic flowchart of a method for dealing with an abnormality of an application program according to an embodiment of this application.

FIG. 2 is a schematic flowchart of a method for dealing with an abnormality of an application program according to an embodiment of this application. The method may be applied to an electronic device, such as a terminal or a server. The method may include the following steps:

Step S200: Record scene information obtained during operation based on a thread of an application program.

Specifically, after a user or a system starts an application program, when the thread of the application program is operated, scene information is recorded really or at a certain interval.

Step S202: Receive abnormality indication information indicating that an abnormality occurs in running of the application program.

Specifically, when the system receives the abnormality indication information indicating that the abnormality occurs to the operation of the application program, it represents that the application program has an abnormality.

Step S204: Extract, from the recorded scene information according to the abnormality indication information, corresponding scene information obtained when the abnormality occurs to the operation of the application program.

Specifically, in this embodiment of this application, the application program is divided into a plurality of functional modules, each of the functional modules has a plurality of UIs, each of the functional modules has a respective unique tag correspondingly, each of the UIs has a respective unique identifier ID correspondingly, and the recorded scene information includes a life cycle node of an operation page that exists during the operation based on the thread of the application program, and a TAG and an ID corresponding to the operation page. After receiving the abnormality indication information, the system triggers to extract, from the recorded scene information, corresponding scene information obtained when the abnormality occurs to the operation of the application program.

Figure 3:
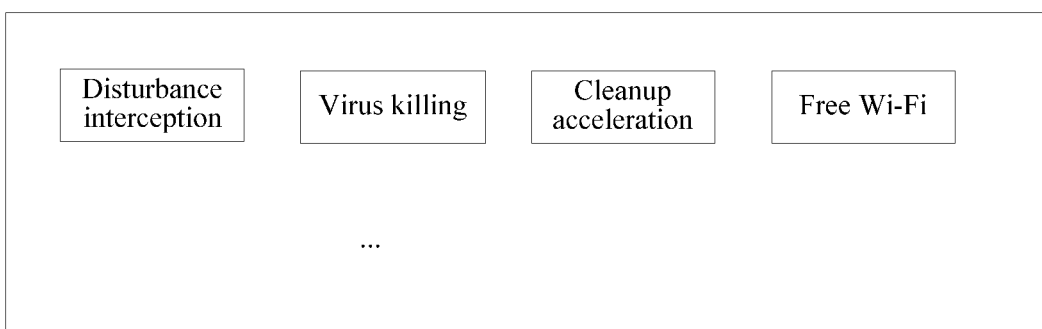
FIG. 3 is a schematic diagram of a principle of dividing functional modules according to an embodiment of this application.
Figure 4:
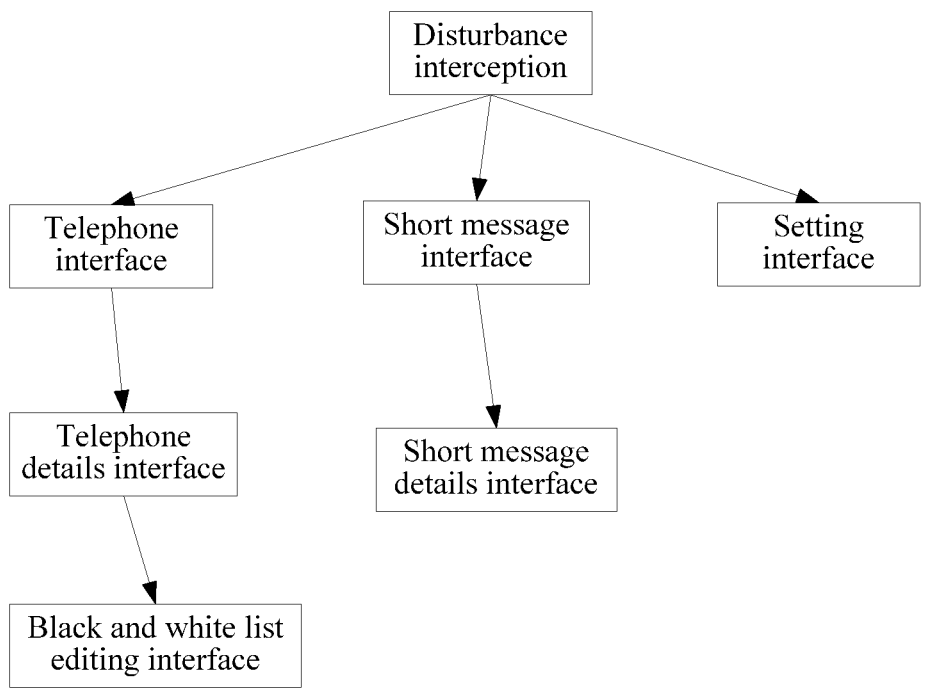
FIG. 4 is a schematic diagram of a principle of a plurality of UIs under a functional module according to an embodiment of this application.

Before step S204, the method further includes: dividing the application program into a plurality of functional modules; and setting a respective unique TAG corresponding to each of the function modules and a respective unique ID corresponding to each of the UIs. Specifically, the application program of the electronic device or a terminal device in this embodiment of this application is divided into a plurality of functional modules or service modules in advance, and FIG. 3 is a schematic diagram of a principle of dividing functional modules according to an embodiment of this application. Each of the functional modules has a plurality of UIs, and FIG. 4 is a schematic diagram of a principle of a plurality of UIs under a functional module according to an embodiment of this application. Furthermore, each functional module of the application program in this embodiment of this application has a respective unique tag correspondingly, and each UI has a respective unique identifier ID correspondingly. That is, some unique identifiers are predefined to distinguish different functional modules and different UIs under each functional module. Therefore, a UI that is being operated by a user may be quickly positioned according to an identifier combination of TAG and ID.

Figure 5:
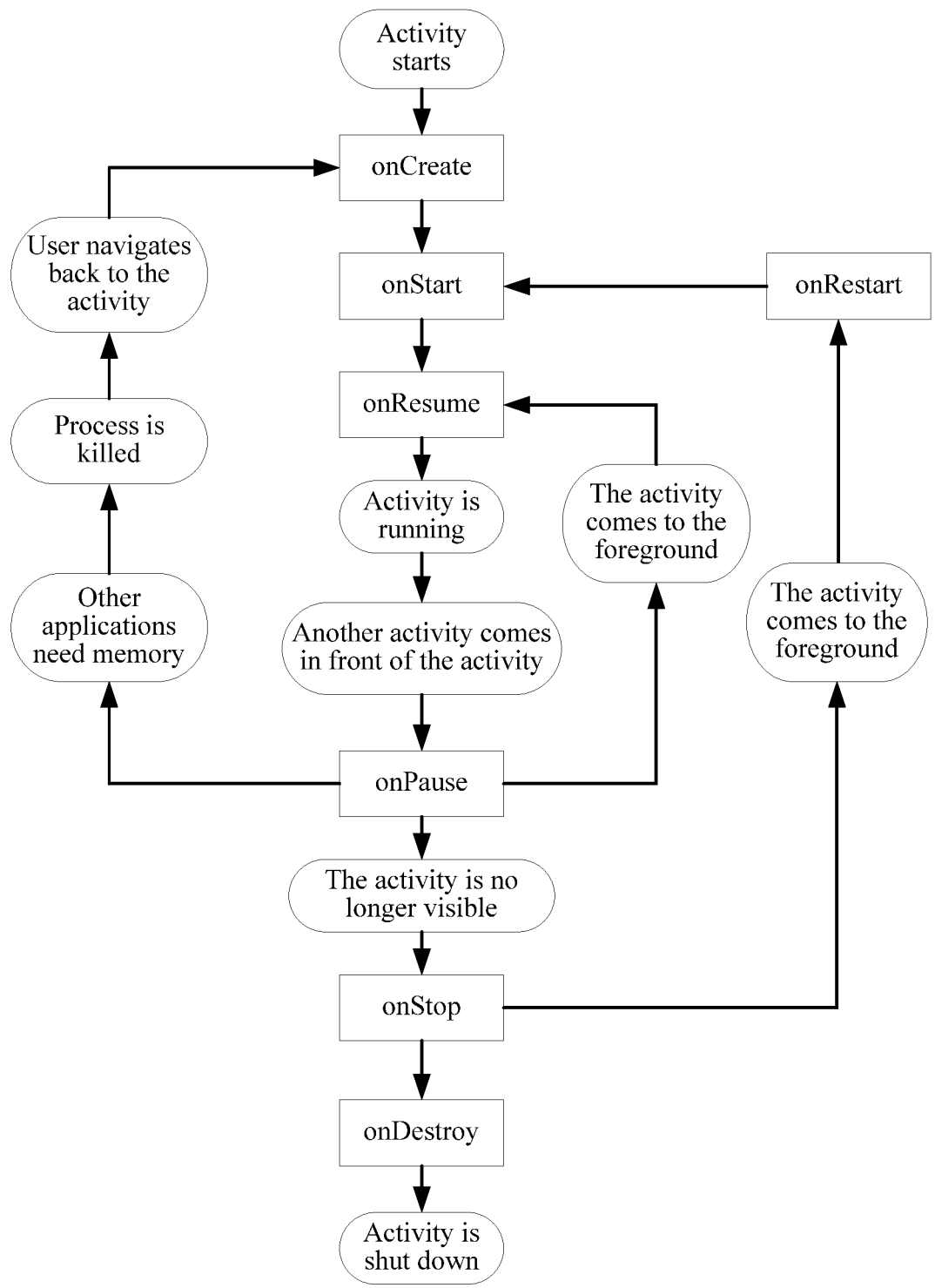
FIG. 5 is a schematic diagram of a life cycle node of an operation page according to an embodiment of this application.

In this embodiment of this application, the scene information includes one or more of the following:

1) A life cycle node of an operation page of an application program;

A life cycle node corresponding to a page in an Android system is taken as an example. FIG. 5 is a schematic diagram of a life cycle node of an operation page according to an embodiment of this application. Each stage (node) in Create→Start→Enter an interface→Pause→Restart→Stop→Destroy circulates in a main thread and possibly suffers an abnormality such as ANR, and an operation stage of the application program in which an abnormality occurs may be learned by recording a life cycle node of the application program in a whole process.

2) TAG and ID corresponding to an operation page;

When a user performs an operation on an application program, a functional module and a UI that the application program enters are recorded. By recording the TAG and ID corresponding to the operation page, the functional module and interface being processed by the application problem when an abnormality occurs may be learned.

3) Event information processed by an event handler of a thread;

Event information processed by event handlers of a main thread and other threads that are not main threads may be recorded. In an actual application, many ANRs are caused by overtime Handler event distribution in the main thread. A specific ID may be set for each Handler event, and an ID of a previous Handler event and ID information of a Handler event when ANR occurs are recorded, so that an event in the Handler that is operated overtime may be quickly positioned, where the overtime event causes other events to be blocked and overtime, causing appearance of ANR.

4) Operation event information on an operation page of an application program;

For example, keystroke or touchscreen event information of the main thread of the application program may be recorded. A user operates a button or clicks operation information of a page, for example, clicks an up event of a back button or slides list event information of a page, thereby further shortening a code segment that may possibly have an abnormality.

5) Broadcast event information for the thread of the application program;

Broadcast event information ID or broadcast Action related information of the thread of the application program is recorded, a specific service module or functional module source may be found according to specific broadcast event information, to determine a service that sends broadcast information causing block and then causing occurrence of ANR.

6) Inter-Process Communication (IPC) for an application program;

A situation that an abnormality occurs in running of an application program is mainly caused by an abnormal task or event processed by a main thread, for example, a task processed by a main thread is overtime, causing the main thread to be blocked, with a result that a to-be-distributed event and broadcast in the main thread or an operation that needs to be performed in the main thread cannot be distributed or implemented in time, causing an abnormality problem such as ANR. However, some situations are caused by Inter-Process Communication (IPC), and therefore, recording IPC information can help to position an abnormality problem appearing in an application program.

7) Service life cycle information of a thread of an application program;

Information such as a specific service name in a thread of an application program is recorded to quickly position a corresponding specific service module when ANR occurs in the service.

Figure 6A:
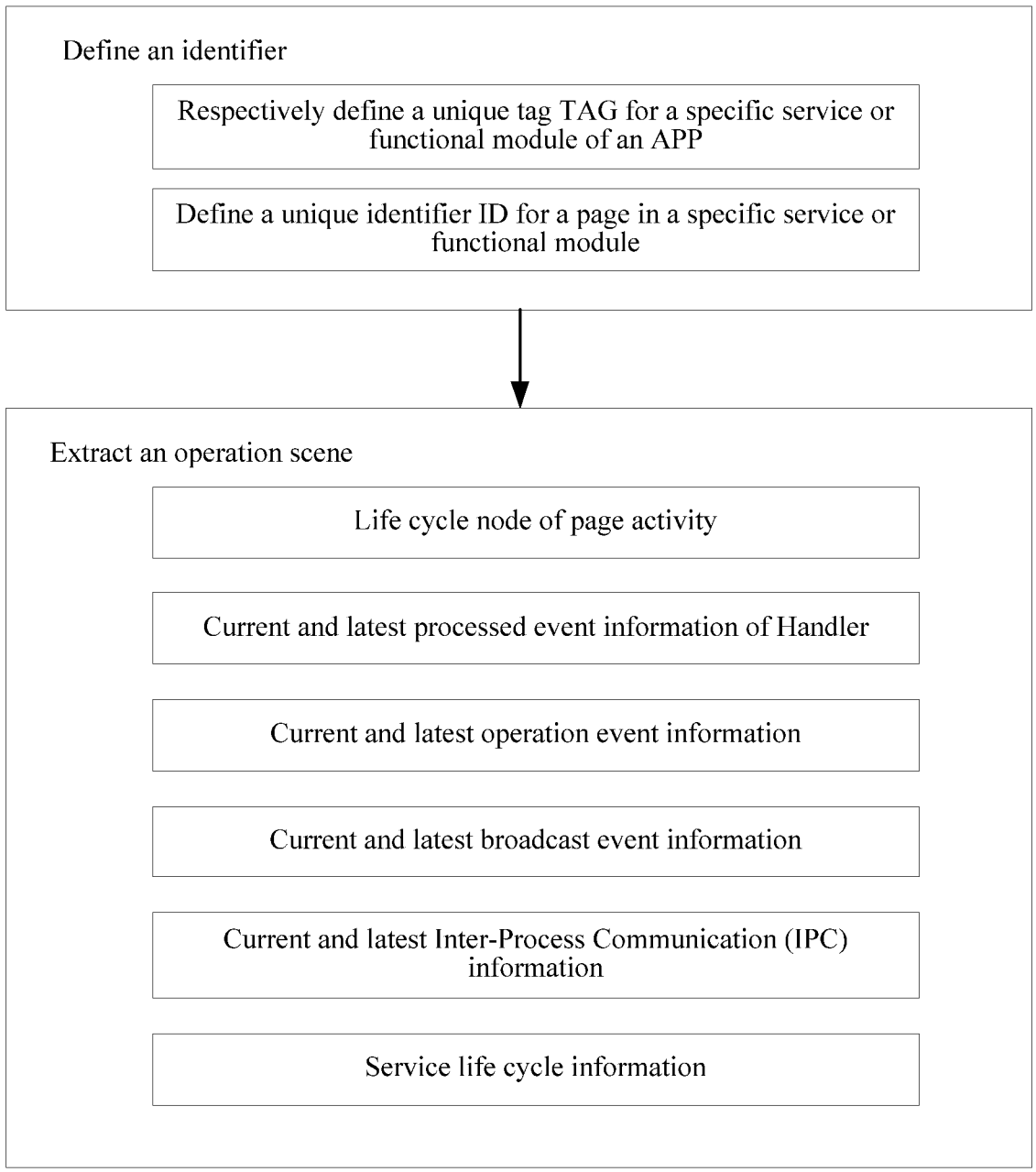
FIG. 6a is a schematic diagram of a principle of extracting scene information according to an embodiment of this application.

Specifically, when an abnormality occurs in running of an application program, corresponding scene information obtained when the abnormality occurs in the application program may be extracted from the recorded scene information. FIG. 6a is a schematic diagram of a principle of extracting scene information according to an embodiment of this application. That is, according to a pre-defined identifier and the recorded scene information, a life cycle node of page activity when an abnormality occurs, current and latest processed event information of handler, current and latest operation event information (such as keystroke event information), current and latest broadcast event information, current and latest IPC information, service life cycle information, or the like may be extracted.

Step S206: Perform abnormality analysis according to the extracted scene information.

Specifically, abnormality analysis may be performed according to the extracted life cycle node of the operation page that exists when the abnormality occurs to the operation of the application program, the TAG and the ID corresponding to the operation page, the event information processed by the event handler, the event information previously processed by the event handler, the current and latest operation event information (such as keystroke event information), the current and latest broadcast event information, the current and latest IPC information, and service life cycle information, and the like.

Figure 6B:
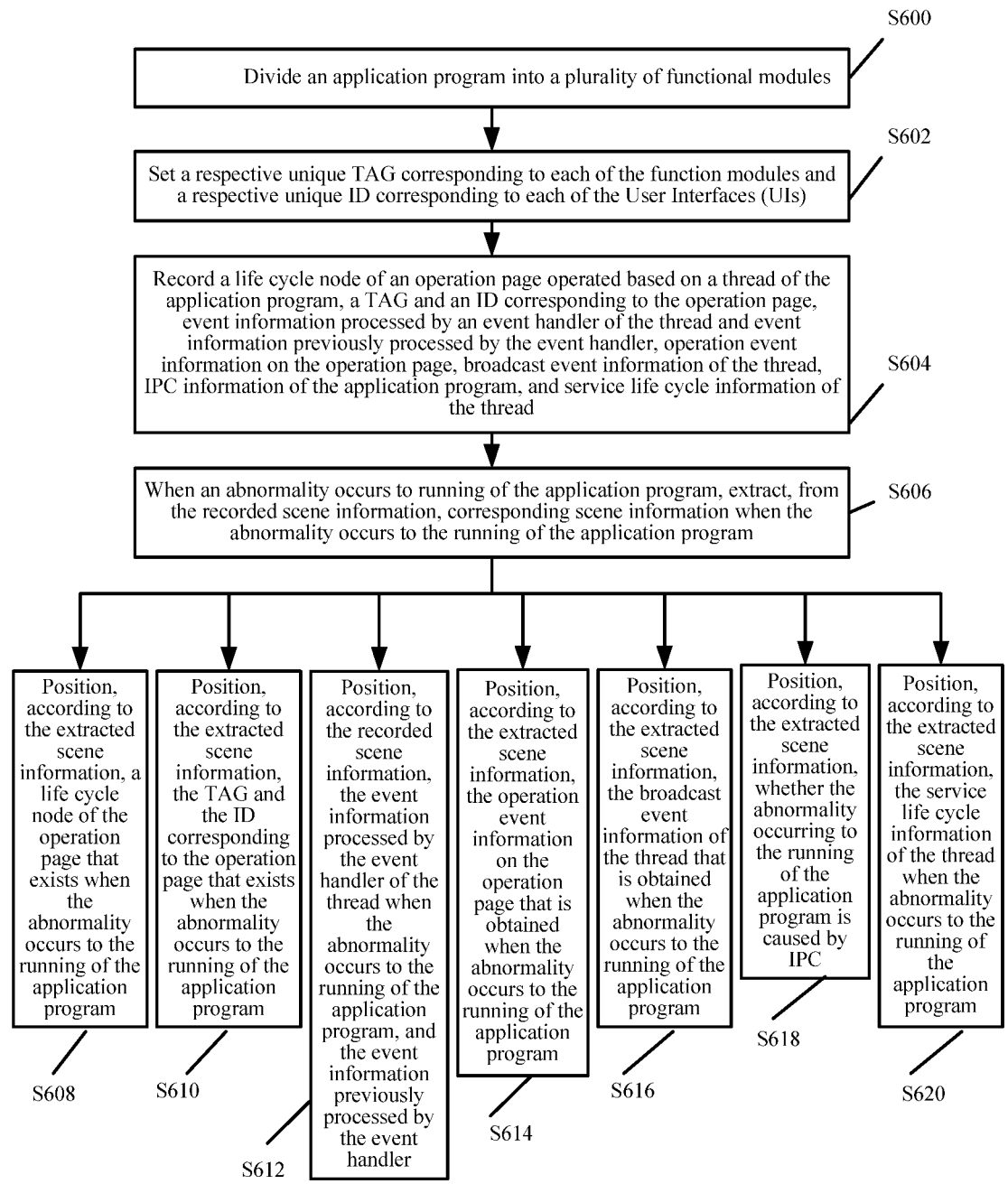
FIG. 6b is another schematic flowchart of a method for dealing with an abnormality of an application program according to an embodiment of this application.

Furthermore, FIG. 6a is taken as an example, FIG. 6b is another schematic flowchart of a method for dealing with an abnormality of an application program according to an embodiment of this application, and with reference to FIG. 6b, the method shown in FIG. 6b includes the following steps:

Step S600: Divide the application program into a plurality of functional modules.

Step S602: Set a respective unique TAG corresponding to each of the function modules and a respective unique ID corresponding to each of the UIs in each of the function modules.

Step S604: Record a life cycle node of an operation page operated based on a thread of an application program, a TAG and an ID corresponding to the operation page, event information processed by an event handler of the thread and event information previously processed by the event handler, operation event information on the operation page, broadcast event information of the thread, IPC information of the application program, and service life cycle information of the thread.

Specifically, the embodiments in FIG. 2 to FIG. 6a may be referred to for the implementation manners in steps S600 to S604, which will not be described repeatedly herein.

Step S606: When an abnormality occurs in running of the application program, extract, from the recorded scene information, corresponding scene information obtained when the abnormality occurs to the operation of the application program.

Step S608: Position, according to the extracted scene information, a life cycle node of the operation page that exists when the abnormality occurs to the operation of the application program.

Specifically, an operation stage of the application program when the abnormality occurs may be positioned according to the extracted life cycle node of the operation page that exists when the abnormality occurs to the operation of the application program.

Step S610: Position, according to the extracted scene information, the TAG and the ID corresponding to the operation page that exists when the abnormality occurs to the operation of the application program.

Specifically, according to the extracted TAG and ID corresponding to the operation page that exists when the abnormality occurs to the operation of the application program, a functional module and a UI which the application program enters are learned, and then, a functional module and an interface processed by the application program when the abnormality occurs may be positioned.

Step S612: Position, according to the recorded scene information, the event information processed by the event handler of the thread when the abnormality occurs to the operation of the application program, and the event information previously processed by the event handler.

Specifically, an event in the Handler of which the operation is overtime to block other events to cause ANR may be positioned quickly according to the extracted event information processed by the event handler of the thread when the abnormality occurs to the operation of the application program and the event information previously processed by the event handler.

Step S614: Position, according to the extracted scene information, the operation event information on the operation page that is obtained when the abnormality occurs to the operation of the application program.

Specifically, a code segment where the abnormality may possible occur may be further shortened according to the extracted operation event information on the operation page that is obtained when the abnormality occurs to the operation of the application program (including clicking and operating an up event of a back key or sliding list event information of the page).

Step S616: Position, according to the extracted scene information, the broadcast event information of the thread that is obtained when the abnormality occurs to the operation of the application program.

Specifically, according to the extracted broadcast event information of the thread that is obtained when the abnormality occurs to the operation of the application program, a specific service module or functional module source may be found, to position the service sending broadcast information that causes a block, resulting in occurrence of ANR.

Step S618: Position, according to the extracted scene information, whether the abnormality occurring in the running of the application program is caused by IPC.

Specifically, IPC information extracted when the abnormality occurs to the operation of the application program may help to position whether the abnormality occurring in the running of the application program is caused by IPC.

Step S620: Position, according to the extracted scene information, the service life cycle information of the thread that is obtained when the abnormality occurs to the operation of the application program.

Specifically, according to the extracted service life cycle information of the thread that is obtained when the abnormality occurs to the operation of the application program, a corresponding service module when ANR occurs in the service may be positioned quickly.

Furthermore, in this embodiment of this application, recording the scene information obtained during operation based on the thread of the application program may include: recording the scene information obtained during operation based on the thread of the application program in a manner of Key-Value, where the Key characterizes a behavior type and the Value characterizes behavior content.

Specifically, for example, when the life cycle node of the operation page of the application program is recorded, the Key may be an identifier of "Activity" to characterize that the type is the life cycle of the operation page, the behavior characterized by the corresponding Value is a specific stage of the life cycle, for example, a stage "onCreate creation", and is used to find a life stage of the page in which a user suffers ANR, whether the ANR occurs when the page is just entered or when the page is destroyed, or in other situations may be positioned, a code segment that causes ANR may be easily found with reference to a service.

For example, when the event information processed by the event handler of the thread is recorded, the Key may be Handler event information to characterize a type, and a corresponding Value may be an ID of the Handler event, processing duration, and so on.

In this embodiment of this application, recording the scene information obtained during operation based on the thread of the application program in the manner of Key-Value may record scene information obtained during operation based on the thread of the application program more clearly and save a space of an electronic device for storing information, and may further obtain a result through analysis more quickly during following abnormality analysis and enhance a processing speed and performance of the processor of the electronic device.

It should be noted that, the method for dealing with an abnormality of an application program in this embodiment of this application may be applicable to an electronic device or a terminal device installed with application programs, such as a personal computer, an intelligent mobile terminal (such as a mobile phone, a mobile computer, or a tablet computer), a personal digital assistant (PDA), a smart television, a smartwatch, smartglasses, and a smart band.

Figure 7:
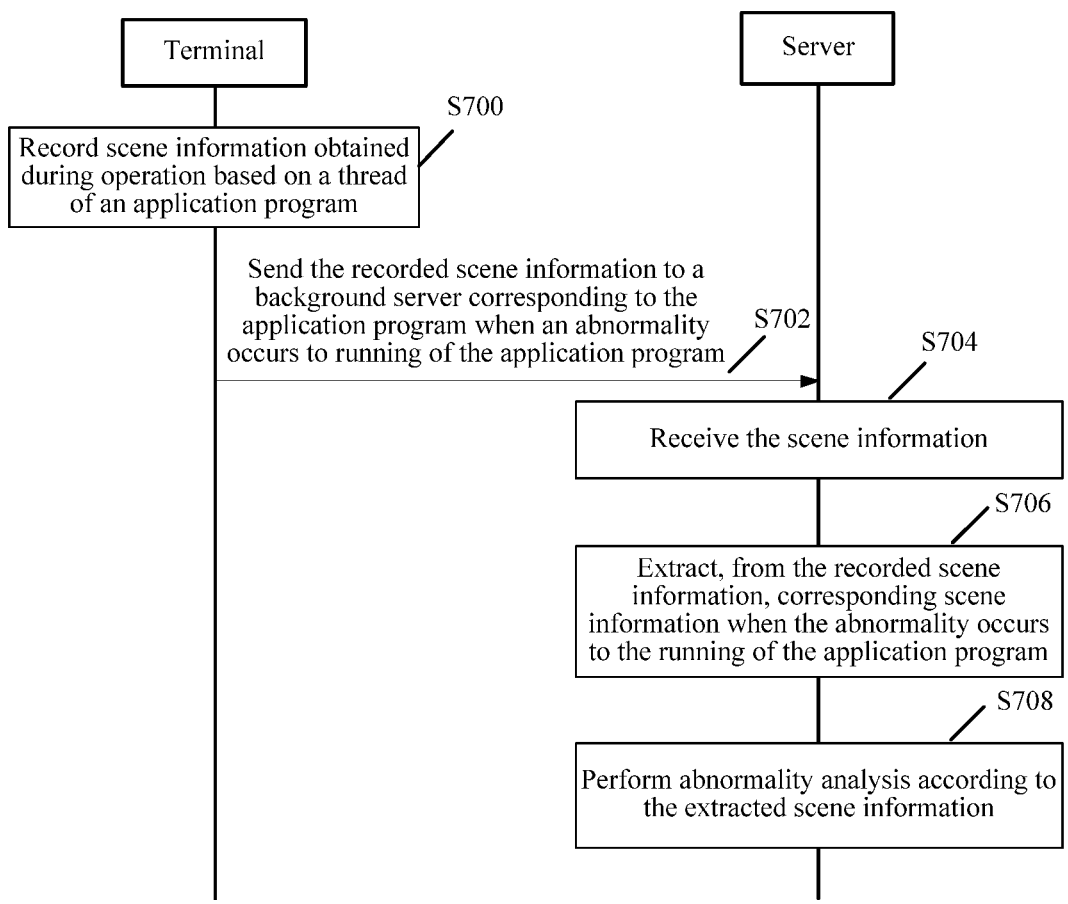
FIG. 7 is another schematic flowchart of a method for dealing with an abnormality of an application program according to an embodiment of this application.

It should be noted that, the operation for performing abnormality analysis in this embodiment of this application may be finished by a background server or a terminal. terminal. If the abnormality analysis is performed by the background server, as shown in FIG. 7, that is, another schematic flowchart of a method for dealing with an abnormality of an application program according to an embodiment of this application, the method for dealing with an abnormality of an application program may include the following steps:

Step S700: The terminal records scene information obtained during operation based on a thread of an application program.

Refer to the description in step S200 in the embodiment in FIG. 2 for details, which will not be described repeatedly herein.

Step S702: The terminal sends the recorded scene information to a background server corresponding to the application program when an abnormality occurs in running of the application program.

Step S704: The background server receives the scene information.

Step S706: The background server extracts, from the recorded scene information, corresponding scene information obtained when the abnormality occurs to the operation of the application program.

Step S708: The background server performs abnormality analysis according to the extracted scene information.

Specifically, refer to the implementation methods of steps S202 and S204 in the embodiment shown in FIG. 2 for specific implementation methods of step S706 and S708, which will not be described repeatedly herein.

This embodiment of this application is implemented by recording scene information obtained during the operation based on the thread of the application program; extracting, when the abnormality occurs to the operation of the application program, from the recorded scene information, corresponding scene information obtained when the abnormality occurs to the operation of the application program, the scene information including a life cycle node of an operation page of the application program, and a TAG and an ID corresponding to the operation page; and then, performing abnormality analysis according to the extracted scene information. The solution provided in this embodiment of this application may find a cause for occurrence of an abnormality quickly and rapidly, and solve the problem that, when an abnormality occurs in an application program, it is difficult to position a cause and repair the abnormality, for example, solve most of ANR problems that cannot be followed up. In addition, the scene information may further include the event information processed by the event handler of the thread, the operation event information on the operation page of the application program, and the service life cycle information of the thread of the application problem, and a specific functional module where the abnormality occurs may be further determined, to facilitate tracking and analysis of the abnormality.

Figure 8A:
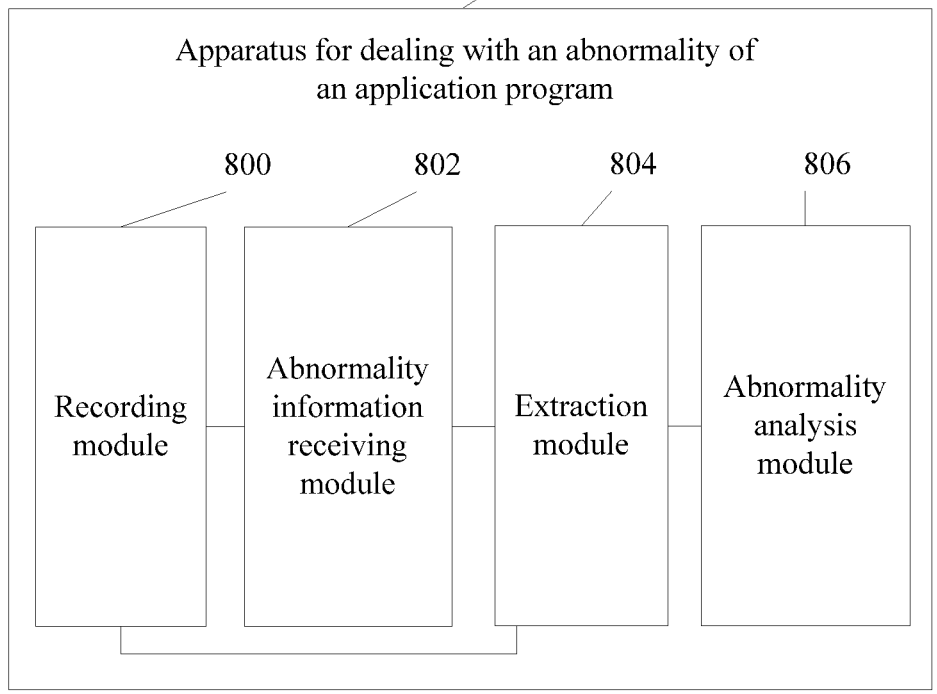
FIG. 8a is a schematic structural diagram of an apparatus for dealing with an abnormality of an application program according to an embodiment of this application.

For ease of better implementing the foregoing solutions in the embodiments of this application, an embodiment of this application further correspondingly provides an apparatus for dealing with an abnormality of an application program, which is described in detail below with reference to the accompanying drawings:

As shown in FIG. 8a, that is, a schematic structural diagram of an apparatus for dealing with an abnormality of an application program according to an embodiment of this application, an apparatus 80 for dealing with an abnormality of an application program may include a recording module 800, an abnormality information receiving module 802, an extraction module 804, and an abnormality analysis module 806.

The recording module 800 is configured to record scene information obtained during operation based on a thread of an application program.

The abnormality information receiving module 802 is configured to receive abnormality indication information indicating that an abnormality occurs in running of the application program.

The extraction module 804 is configured to extract, from the recorded scene information according to the abnormality indication information, corresponding scene information obtained when the abnormality occurs to the operation of the application program, the application program being divided into a plurality of functional modules, each of the functional modules having a plurality of UIs, each of the functional modules having a respective unique tag correspondingly, each of the UIs having a respective unique identifier ID correspondingly, and the recorded scene information including a life cycle node of an operation page that exists during the operation based on the thread of the application program, and a TAG and an ID corresponding to the operation page.

The abnormality analysis module 806 is configured to perform abnormality analysis according to the extracted scene information.

Figure 8B:
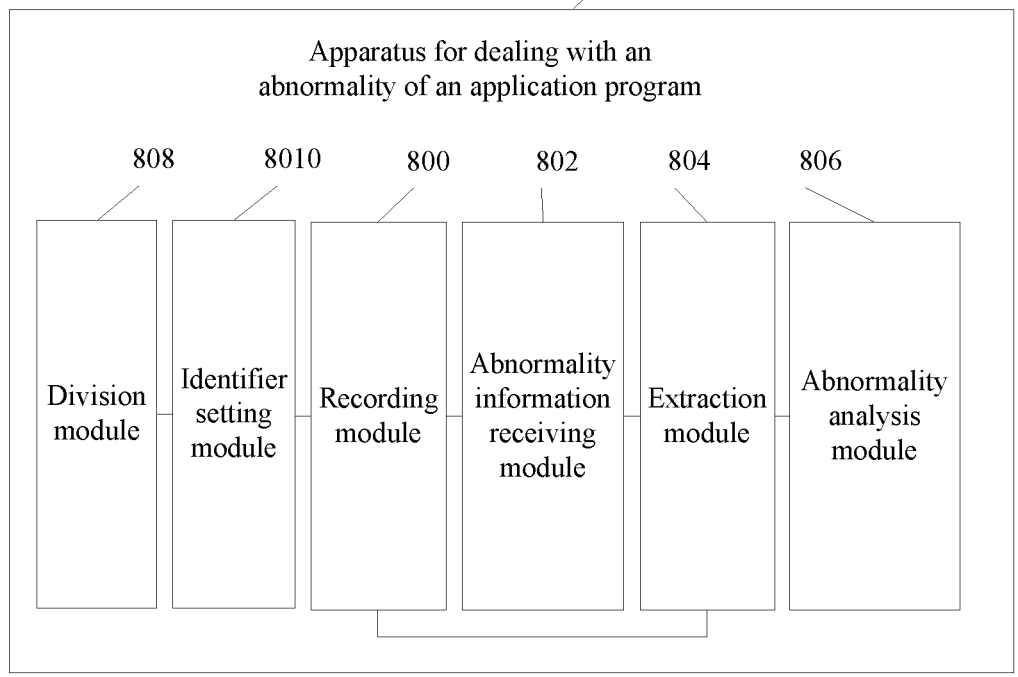
FIG. 8b is another schematic structural diagram of an apparatus for dealing with an abnormality of an application program according to an embodiment of this application.

As shown in FIG. 8b, that is, another schematic structural diagram of an apparatus for dealing with an abnormality of an application program according to an embodiment of this application, the apparatus 80 for dealing with an abnormality of an application program may further include a division module 808 and an identifier setting module 8010.

The division module 808 is configured to divide the application program into a plurality of functional modules before the extraction module 804 extracts, from the recorded scene information, corresponding scene information obtained when the abnormality occurs to the operation of the application program.

The identifier setting module 8010 is configured to set a respective unique TAG corresponding to each of the function modules and a respective unique ID corresponding to each of the UIs.

In some embodiments of this application, the abnormality analysis module 806 may be further configured to send the recorded scene information to a background server corresponding to the application program, so that the background server extracts, from the recorded scene information, the corresponding scene information obtained when the abnormality occurs to the operation of the application program, and performs abnormality analysis according to the extracted scene information.

In some embodiments of this application, the extraction module 804 may be further configured to extract, from the recorded scene information, a life cycle node of an operation page that exists when the abnormality occurs to the operation of the application program, and a TAG and an ID corresponding to the operation page.

The abnormality analysis module 806 may further include a first positioning unit, configured to position, according to the extracted scene information, the life cycle node of the operation page that exists when the abnormality occurs to the operation of the application program, and the TAG and the ID corresponding to the operation page.

The scene information recorded by the recording module 800 may further include event information processed by an event handler of the thread, and the event information includes an identifier of a processed event and processing duration.

The extraction module 804 may be further configured to extract, from the recorded scene information, event information processed by the event handler of the thread when the abnormality occurs to the operation of the application program, and event information previously processed by the event handler.

The abnormality analysis module 806 may further include a second positioning unit, configured to position, according to the extracted scene information, the event information processed by the event handler of the thread when the abnormality occurs to the operation of the application program, and the event information previously processed by the event handler.

The scene information recorded by the recording module 800 may further include operation event information on the operation page of the application program.

The extraction module 804 may be further configured to extract, from the recorded scene information, the operation event information on the operation page that is obtained when the abnormality occurs to the operation of the application program.

The abnormality analysis module 806 may further include a third positioning unit, configured to position, according to the extracted scene information, the operation event information on the operation page that is obtained when the abnormality occurs to the operation of the application program.

The scene information recorded by the recording module 800 may further include broadcast event information of the thread of the application program.

The extraction module 804 may be further configured to extract, from the recorded scene information, the broadcast event information of the thread that is obtained when the abnormality occurs to the operation of the application program.

The abnormality analysis module 806 may further include a fourth positioning unit, configured to position, according to the extracted scene information, the broadcast event information of the event when the abnormality occurs to the operation of the application program.

The scene information recorded by the recording module 800 may further include service life cycle information of the tread of the application program.

The extraction module 804 may be further configured to extract, from the recorded scene information, the service life cycle information of the thread that is obtained when the abnormality occurs to the operation of the application program.

The abnormality analysis module 806 may further include a fifth positioning unit, configured to position, according to the extracted scene information, the service life cycle information of the thread that is obtained when the abnormality occurs to the operation of the application program.

The recording module 800 may be further configured to record the scene information obtained during the operation based on the thread of the application program in a manner of Key-Value, where the Key characterizes a behavior type and the Value characterizes behavior content.

Figure 9:
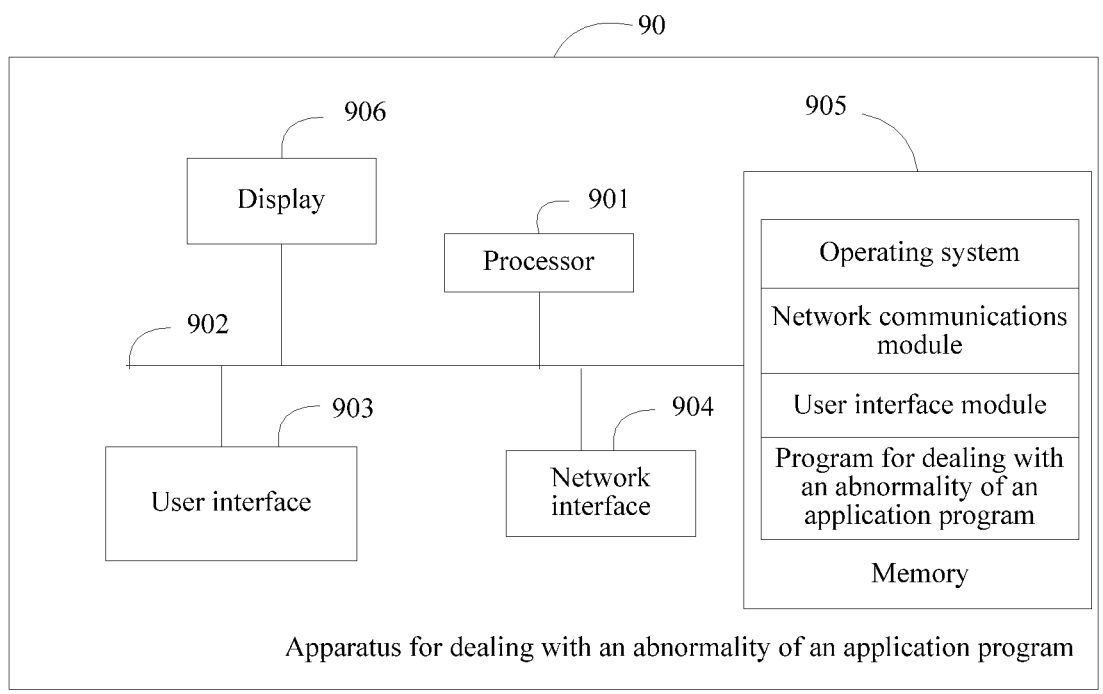
FIG. 9 is another schematic structural diagram of an apparatus for dealing with an abnormality of an application program according to an embodiment of this application.

With reference to FIG. 9, FIG. 9 is another schematic structural diagram of an apparatus for dealing with an abnormality of an application program according to an embodiment of this application. As shown in FIG. 9, the apparatus 90 for dealing with an abnormality of an application program may include at least one processor 901, for example, CPU, at least one network interface 904, a user interface 903, a memory 905, at least one communication bus 902, and a display screen 906. The communications bus 902 is configured to implement connection and communication between the components. The user interface 903 may include a touchscreen, and the like. Optionally, the network interface 904 may include a standard wired interface and a standard wireless interface (such as a Wi-Fi interface). The memory 905 may be a high-speed RAM memory, or may be a non-volatile memory or a non-transitory memory, for example, at least one magnetic disk memory. The memory 905 includes a flash in this embodiment of this application. The memory 905 may further be at least one storage system that is located far away from the processor 901. As shown in FIG. 9, the memory 905, as a computer storage medium, may include an operating system, a network communications module, a user interface, and machine-readable instructions, a program for dealing with an abnormality of an application program.

In the apparatus 90 for dealing with an abnormality of an application program in FIG. 9, the processor 901 may be configured to invoke a program for dealing with an abnormality of an application program stored in the memory 905 to perform the following operations:

recording scene information obtained during operation based on a thread of an application program;

receiving abnormality indication information indicating that an abnormality occurs in running of the application program;

extracting, from the recorded scene information according to the abnormality indication information, corresponding scene information obtained when the abnormality occurs to the operation of the application program, the application program being divided into a plurality of functional modules, each of the functional modules having a plurality of UIs, each of the functional modules having a respective unique tag correspondingly, each of the UIs having a respective unique identifier ID correspondingly, and the recorded scene information including a life cycle node of an operation page that exists during the operation based on the thread of the application program, and a TAG and an ID corresponding to the operation page; and performing abnormality analysis according to the extracted scene information.

In this embodiment of this application, when the abnormality occurs to the operation of the application program, before extracting, from the recorded scene information according to the abnormality indication information, corresponding scene information obtained when the abnormality occurs to the operation of the application program, the processor 901 further performs the following operations:

dividing the application program into a plurality of functional modules; and setting a respective unique TAG corresponding to each of the function modules and a respective unique ID corresponding to each of the UIs.

In some embodiments of this application, the extracting, by the processor 901, from the recorded scene information, corresponding scene information obtained when the abnormality occurs to the operation of the application program and performing abnormality analysis according to the extracted scene information may include:

sending the recorded scene information to a background server corresponding to the application program through the network interface 904, so that the background server extracts, from the recorded scene information, the corresponding scene information obtained when the abnormality occurs to the operation of the application program, and performs abnormality analysis according to the extracted scene information.

The extracting, by the processor 901, from the recorded scene information, corresponding scene information obtained when the abnormality occurs to the operation of the application program further includes: extracting, from the recorded scene information, a life cycle node of an operation page that exists when the abnormality occurs to the operation of the application program, and a TAG and an ID corresponding to the operation page.

The performing, by the processor 901, abnormality analysis according to the extracted scene information may include: positioning, according to the extracted scene information, the life cycle node of the operation page that exists when the abnormality occurs to the operation of the application program, and the TAG and the ID corresponding to the operation page.

In this embodiment of this application, the recorded scene information may further include event information processed by an event handler of the thread, and the event information includes an identifier of a processed event and processing duration.

The extracting, by the processor 901, from the recorded scene information, corresponding scene information obtained when the abnormality occurs to the operation of the application program may further include: extracting, from the recorded scene information, event information processed by the event handler when the abnormality occurs to the operation of the application program, and event information previously processed by the event handler.

The performing, by the processor 901, abnormality analysis according to the extracted scene information may further include: positioning, according to the extracted scene information, the event information processed by the event handler of the thread when the abnormality occurs to the operation of the application program, and the event information previously processed by the event handler.

In this embodiment of this application, the recorded scene information may further include operation event information on the operation page of the application program.

The extracting, by the processor 901, from the recorded scene information, corresponding scene information obtained when the abnormality occurs to the operation of the application program may further include: extracting, from the recorded scene information, the operation event information obtained when the abnormality occurs to the operation of the application program.

The performing, by the processor 901, abnormality analysis according to the extracted scene information may further include: positioning, according to the extracted scene information, the operation event information on the operation page that is obtained when the abnormality occurs to the operation of the application program.

In this embodiment of this application, the recorded scene information may further include broadcast event information of the thread of the application program.

The extracting, by the processor 901, from the recorded scene information, corresponding scene information obtained when the abnormality occurs to the operation of the application program may further include: extracting, from the recorded scene information, the broadcast event information of the thread that is obtained when the abnormality occurs to the operation of the application program.

The performing, by the processor 901, abnormality analysis according to the extracted scene information may further include: positioning, according to the extracted scene information, the broadcast event information of the thread that is obtained when the abnormality occurs to the operation of the application program.

In this embodiment of this application, the recorded scene information may further include service life cycle information of the thread of the application program.

The extracting, by the processor 901, from the recorded scene information, corresponding scene information obtained when the abnormality occurs to the operation of the application program may further include: extracting, from the recorded scene information, the service life cycle information of the thread that is obtained when the abnormality occurs to the operation of the application program.

The performing, by the processor 901, abnormality analysis according to the extracted scene information may further include: positioning, according to the extracted scene information, the service life cycle information of the thread that is obtained when the abnormality occurs to the operation of the application program.

In this embodiment of this application, the recording, by the processor 901, scene information obtained during the operation based on the thread of the application program may include:

recording the scene information obtained during operation based on the thread of the application program in a manner of Key-Value, where the Key characterizes a behavior type and the Value characterizes behavior content.

It should be noted that, for functions of each of the modules in the apparatus 80 for dealing with an abnormality of an application program or the apparatus 90 for dealing with an abnormality of an application program in the embodiments of this application, refer to a specific implementation of any embodiment of FIG. 1 to FIG. 7 in the foregoing method embodiments, and details are not described repeatedly herein. The apparatus 80 for dealing with an abnormality of an application program or the apparatus 90 for dealing with an abnormality of an application program may include, but is not limited to, an electronic device or a terminal device installed with application programs, a personal computer, an intelligent mobile terminal (such as a mobile phone, a mobile computer, or a tablet computer), a personal digital assistant (PDA), a smart television, a smartwatch, smartglasses, and a smart band.

Figure 10:
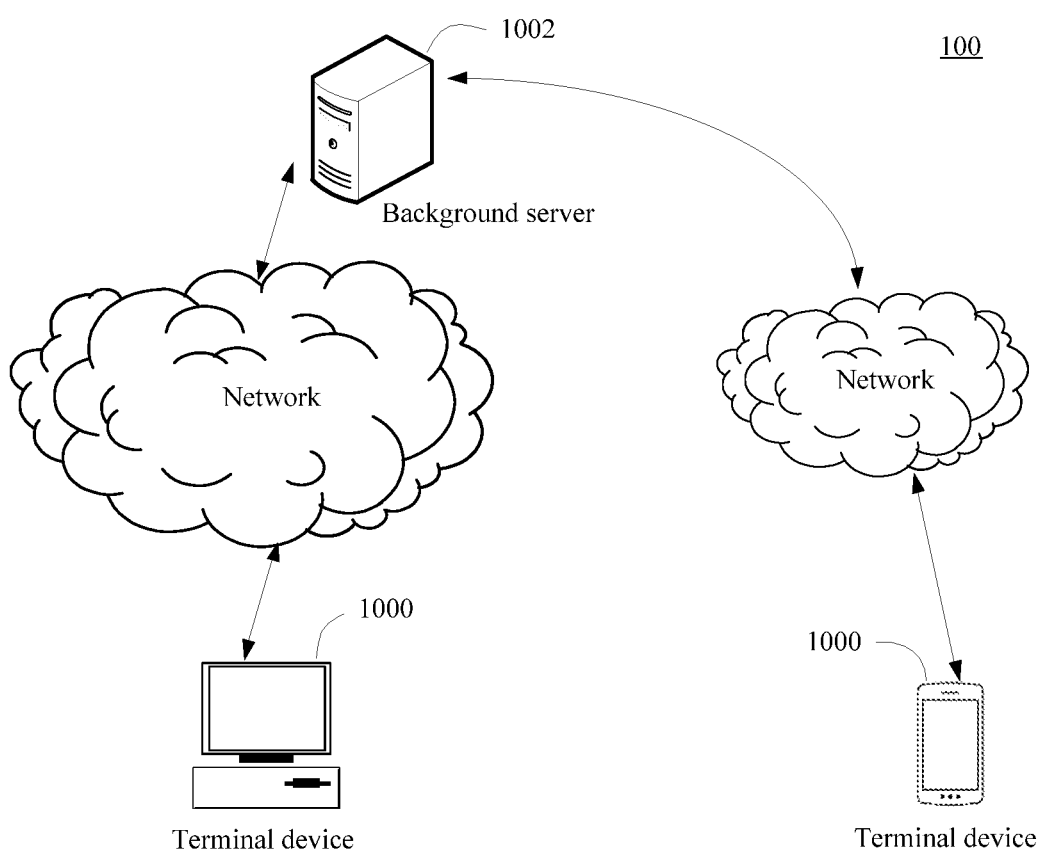
FIG. 10 is a schematic structural diagram of a system for dealing with an abnormality of an application program according to an embodiment of this application.

FIG. 10 is a schematic structural diagram of a system for dealing with an abnormality of an application program according to an embodiment of this application. The system 100 for dealing with an abnormality of an application program may include a terminal device 1000 and a background server 1002, where the terminal device 1000 may be the apparatus 80 for dealing with an abnormality of an application program or the apparatus 90 for dealing with an abnormality of an application program in the embodiments of this application. In some embodiments of this application, after the terminal device 1000 records scene information obtained during operation based on a thread of an application program, if an abnormality occurs in running of the application program, the terminal device 1000 sends the recorded scene information to the background server 1002 corresponding to the application program, and the background server 1002 extracts, from the recorded scene information, corresponding scene information obtained when the abnormality occurs to the operation of the application program and performs abnormality analysis according to the extracted scene information. In some other embodiments of this application, the terminal device 1000 may also perform the abnormality analysis, that is, after the terminal device 1000 records scene information obtained during operation based on a thread of an application program, if an abnormality occurs in running of the application program, the terminal device 1000 extracts, from the recorded scene information, corresponding scene information obtained when the abnormality occurs to the operation of the application program and performs abnormality analysis according to the extracted scene information.

This embodiment of this application is implemented by recording scene information obtained during the operation based on the thread of the application program; extracting, when the abnormality occurs to the operation of the application program, from the recorded scene information, corresponding scene information obtained when the abnormality occurs to the operation of the application program, the scene information including a life cycle node of an operation page of the application program, and a TAG and an ID corresponding to the operation page; and then, performing abnormality analysis according to the extracted scene information. The solution provided in this embodiment of this application may find a cause for occurrence of an abnormality quickly and rapidly, and solve the problem that, when an abnormality occurs in an application program, it is difficult to position a cause and repair the abnormality, for example, solve most of ANR problems that cannot be followed up. In addition, the scene information may further include the event information processed by the event handler of the thread, the operation event information on the operation page of the application program, and the service life cycle information of the thread of the application problem, and a specific functional module where the abnormality occurs may be further determined, to facilitate tracking and analysis of the abnormality.

A person of ordinary skill in the art may understand that all or some of the processes of the methods in the embodiments may be implemented by a computer program instructing relevant hardware. The program may be stored in a computer-readable storage medium. When the program is executed, the procedures of the methods in the embodiments are performed. The foregoing storage medium may be a magnetic disk, an optical disc, a read-only memory (ROM), or a random access memory (RAM).

The foregoing disclosure is merely exemplary embodiments of this application, and certainly is not intended to limit the protection scope of this application. Therefore, equivalent variations made in accordance with the claims of this application shall fall within the scope of this application.

What is claimed is:

1. A method for dealing with an abnormality of an application program performed at a computing device having one or more processors and memory storing a plurality of computer-executable instructions be executed by the one or more processors, the method comprising:

recording scene information obtained during an operation of an application program based on a thread of the application program;

receiving abnormality indication information indicating that an abnormality occurs to the operation of the application program;

in response to the abnormality indication information, extracting, from the recorded scene information according to the abnormality indication information, corresponding scene information obtained when the abnormality occurs to the operation of the application program, the application program being divided into a plurality of functional modules, each of the functional modules having a plurality of user interfaces (UI), each of the functional modules having a respective unique tag correspondingly, each of the UIs having a respective unique identifier ID correspondingly, and the recorded scene information comprising a life cycle node of an operation page that exists during the operation based on the thread of the application program, and a tag and an ID corresponding to the operation page; and performing abnormality analysis according to the extracted scene information.

2. The method according to claim 1, further comprising: before extracting, from the recorded scene information according to the abnormality indication information, corresponding scene information obtained when the abnormality occurs to the operation of the application program:

dividing the application program into the plurality of functional modules; and setting a respective unique tag corresponding to each of the function modules and a respective unique ID corresponding to each of the UIs.

3. The method according to claim 1, wherein the extracting, from the recorded scene information, corresponding scene information obtained when the abnormality occurs to the operation of the application program and performing abnormality analysis according to the extracted scene information comprises:

sending the recorded scene information to a background server corresponding to the application program, so that the background server extracts, from the recorded scene information, the corresponding scene information obtained when the abnormality occurs to the operation of the application program, and performs abnormality analysis according to the extracted scene information.

4. The method according to claim 1, wherein the extracting, from the recorded scene information, corresponding scene information obtained when the abnormality occurs to the operation of the application program further comprises:

extracting, from the recorded scene information, a life cycle node of an operation page of the application program that exists when the abnormality occurs to the operation of the application program, and a tag and an ID corresponding to the operation page; and the performing abnormality analysis according to the extracted scene information comprises:

positioning, according to the extracted scene information, the life cycle node of the operation page that exists when the abnormality occurs to the operation of the application program, and the tag and the ID corresponding to the operation page.

5. The method according to claim 4, wherein the recorded scene information further comprises event information processed by an event handler of the thread, and the event information comprises an identifier of a processed event and processing duration;

the extracting, from the recorded scene information, corresponding scene information obtained when the abnormality occurs to the operation of the application program further comprises:

extracting, from the recorded scene information, event information processed by the event handler when the abnormality occurs to the operation of the application program, and event information previously processed by the event handler; and the performing abnormality analysis according to the extracted scene information further comprises:

positioning, according to the extracted scene information, the event information processed by the event handler of the thread when the abnormality occurs to the operation of the application program, and the event information previously processed by the event handler.

6. The method according to claim 5, wherein the recorded scene information further comprises operation event information on the operation page of the application program;

the extracting, from the recorded scene information, corresponding scene information obtained when the abnormality occurs to the operation of the application program further comprises:

extracting, from the recorded scene information, the operation event information obtained when the abnormality occurs to the operation of the application program; and the performing abnormality analysis according to the extracted scene information further comprises:

positioning, according to the extracted scene information, the operation event information on the operation page that is obtained when the abnormality occurs to the operation of the application program.

7. The method according to claim 6, wherein the recorded scene information further comprises broadcast event information of the thread of the application program;

the extracting, from the recorded scene information, corresponding scene information obtained when the abnormality occurs to the operation of the application program further comprises:

extracting, from the recorded scene information, the broadcast event information of the thread that is obtained when the abnormality occurs to the operation of the application program; and the performing abnormality analysis according to the extracted scene information further comprises:

positioning, according to the extracted scene information, the broadcast event information of the thread that is obtained when the abnormality occurs to the operation of the application program.

8. A computing device comprising one or more processors, memory coupled to the one or more processors and a plurality of computer-executable instructions stored in the memory that, when executed by the one or more processors, cause the computing device to perform a plurality of operations comprising:

recording scene information obtained during an operation of an application program based on a thread of the application program;

receiving abnormality indication information indicating that an abnormality occurs to the operation of the application program;

in response to the abnormality indication information, extracting, from the recorded scene information according to the abnormality indication information, corresponding scene information obtained when the abnormality occurs to the operation of the application program, the application program being divided into a plurality of functional modules, each of the functional modules having a plurality of user interfaces (UI), each of the functional modules having a respective unique tag correspondingly, each of the UIs having a respective unique identifier ID correspondingly, and the recorded scene information comprising a life cycle node of an operation page that exists during the operation based on the thread of the application program, and a tag and an ID corresponding to the operation page; and performing abnormality analysis according to the extracted scene information.

9. The computing device according to claim 8, wherein the plurality of operations further comprise:
before extracting, from the recorded scene information according to the abnormality indication information, corresponding scene information obtained when the abnormality occurs to the operation of the application program:
dividing the application program into the plurality of functional modules; and
setting a respective unique tag corresponding to each of the function modules and a respective unique ID corresponding to each of the UIs.

10. The computing device according to claim 8, wherein the extracting, from the recorded scene information, corresponding scene information obtained when the abnormality occurs to the operation of the application program and performing abnormality analysis according to the extracted scene information comprises:
sending the recorded scene information to a background server corresponding to the application program, so that the background server extracts, from the recorded scene information, the corresponding scene information obtained when the abnormality occurs to the operation of the application program, and performs abnormality analysis according to the extracted scene information.

11. The computing device according to claim 8, wherein the extracting, from the recorded scene information, corresponding scene information obtained when the abnormality occurs to the operation of the application program further comprises:
extracting, from the recorded scene information, a life cycle node of an operation page of the application program that exists when the abnormality occurs to the operation of the application program, and a tag and an ID corresponding to the operation page; and
the performing abnormality analysis according to the extracted scene information comprises:
positioning, according to the extracted scene information, the life cycle node of the operation page that exists when the abnormality occurs to the operation of the application program, and the tag and the ID corresponding to the operation page.

12. The computing device according to claim 11, wherein the recorded scene information further comprises event information processed by an event handler of the thread, and the event information comprises an identifier of a processed event and processing duration;
the extracting, from the recorded scene information, corresponding scene information obtained when the abnormality occurs to the operation of the application program further comprises:
extracting, from the recorded scene information, event information processed by the event handler when the abnormality occurs to the operation of the application program, and event information previously processed by the event handler; and
the performing abnormality analysis according to the extracted scene information further comprises:
positioning, according to the extracted scene information, the event information processed by the event handler of the thread when the abnormality occurs to the operation of the application program, and the event information previously processed by the event handler.

13. The computing device according to claim 12, wherein the recorded scene information further comprises operation event information on the operation page of the application program;
the extracting, from the recorded scene information, corresponding scene information obtained when the abnormality occurs to the operation of the application program further comprises:
extracting, from the recorded scene information, the operation event information obtained when the abnormality occurs to the operation of the application program; and
the performing abnormality analysis according to the extracted scene information further comprises:
positioning, according to the extracted scene information, the operation event information on the operation page that is obtained when the abnormality occurs to the operation of the application program.

14. The computing device according to claim 13, wherein the recorded scene information further comprises broadcast event information of the thread of the application program;
the extracting, from the recorded scene information, corresponding scene information obtained when the abnormality occurs to the operation of the application program further comprises:
extracting, from the recorded scene information, the broadcast event information of the thread that is obtained when the abnormality occurs to the operation of the application program; and
the performing abnormality analysis according to the extracted scene information further comprises:
positioning, according to the extracted scene information, the broadcast event information of the thread that is obtained when the abnormality occurs to the operation of the application program.

15. A non-transitory computer readable storage medium storing a plurality of machine readable, computer-executable instructions in connection with a computing device having one or more processors, wherein the plurality of machine readable computer-executable instructions, when executed by the one or more processors, cause the terminal to perform a plurality of operations including:
recording scene information obtained during an operation of an application program based on a thread of the application program;
receiving abnormality indication information indicating that an abnormality occurs to the operation of the application program;
in response to the abnormality indication information, extracting, from the recorded scene information according to the abnormality indication information, corresponding scene information obtained when the abnormality occurs to the operation of the application program, the application program being divided into a plurality of functional modules, each of the functional modules having a plurality of user interfaces (UI), each of the functional modules having a respective unique tag correspondingly, each of the UIs having a respective unique identifier ID correspondingly, and the recorded scene information comprising a life cycle node of an operation page that exists during the operation based on the thread of the application program, and a tag and an ID corresponding to the operation page; and performing abnormality analysis according to the extracted scene information.

16. The non-transitory computer readable storage medium according to claim 15, wherein the plurality of operations further comprise:
before extracting, from the recorded scene information according to the abnormality indication information, corresponding scene information obtained when the abnormality occurs to the operation of the application program:
dividing the application program into the plurality of functional modules; and
setting a respective unique tag corresponding to each of the function modules and a respective unique ID corresponding to each of the UIs.

17. The non-transitory computer readable storage medium according to claim 15, wherein the extracting, from the recorded scene information, corresponding scene information obtained when the abnormality occurs to the operation of the application program and performing abnormality analysis according to the extracted scene information comprises:
sending the recorded scene information to a background server corresponding to the application program, so that the background server extracts, from the recorded scene information, the corresponding scene information obtained when the abnormality occurs to the operation of the application program, and performs abnormality analysis according to the extracted scene information.

18. The non-transitory computer readable storage medium according to claim 15, wherein
the extracting, from the recorded scene information, corresponding scene information obtained when the abnormality occurs to the operation of the application program further comprises:
extracting, from the recorded scene information, a life cycle node of an operation page of the application program that exists when the abnormality occurs to the operation of the application program, and a tag and an ID corresponding to the operation page; and
the performing abnormality analysis according to the extracted scene information comprises:
positioning, according to the extracted scene information, the life cycle node of the operation page that exists when the abnormality occurs to the operation of the application program, and the tag and the ID corresponding to the operation page.

19. The non-transitory computer readable storage medium according to claim 18, wherein the recorded scene information further comprises event information processed by an event handler of the thread, and the event information comprises an identifier of a processed event and processing duration;
the extracting, from the recorded scene information, corresponding scene information obtained when the abnormality occurs to the operation of the application program further comprises:
extracting, from the recorded scene information, event information processed by the event handler when the abnormality occurs to the operation of the application program, and event information previously processed by the event handler; and
the performing abnormality analysis according to the extracted scene information further comprises:
positioning, according to the extracted scene information, the event information processed by the event handler of the thread when the abnormality occurs to the operation of the application program, and the event information previously processed by the event handler.

20. The non-transitory computer readable storage medium according to claim 19, wherein the recorded scene information further comprises operation event information on the operation page of the application program;
the extracting, from the recorded scene information, corresponding scene information obtained when the abnormality occurs to the operation of the application program further comprises:
extracting, from the recorded scene information, the operation event information obtained when the abnormality occurs to the operation of the application program; and
the performing abnormality analysis according to the extracted scene information further comprises:
positioning, according to the extracted scene information, the operation event information on the operation page that is obtained when the abnormality occurs to the operation of the application program.

* * * * *